(12) United States Patent
Schempp

(10) Patent No.: US 7,637,671 B2
(45) Date of Patent: Dec. 29, 2009

(54) OPTICAL CONNECTOR

(75) Inventor: Otto Schempp, Bad Rappenau (DE)

(73) Assignee: Molex Incorporated, Lisle, IL (US)

( * ) Notice: Subject to any disclaimer, the term of this patent is extended or adjusted under 35 U.S.C. 154(b) by 13 days.

(21) Appl. No.: 10/593,139

(22) PCT Filed: Mar. 18, 2005

(86) PCT No.: PCT/EP2005/002925

§ 371 (c)(1),
(2), (4) Date: Jun. 21, 2007

(87) PCT Pub. No.: WO2005/091034

PCT Pub. Date: Sep. 29, 2005

(65) Prior Publication Data

US 2008/0037937 A1 Feb. 14, 2008

(30) Foreign Application Priority Data

Mar. 19, 2004 (DE) .................. 10 2004 013 969

(51) Int. Cl.
*G02B 6/36* (2006.01)
(52) U.S. Cl. .............. 385/89; 385/77; 385/88; 385/92
(58) Field of Classification Search ........ 385/77, 385/88, 89, 92
See application file for complete search history.

(56) References Cited

U.S. PATENT DOCUMENTS 4,102,579 A * 7/1978 Stewart ............... 356/73.1
6,335,869 B1 * 1/2002 Branch et al. ........... 361/816
2003/0156802 A1 8/2003 Togami et al.

FOREIGN PATENT DOCUMENTS

EP 0267074 5/1988
GB 2322784 9/1998

OTHER PUBLICATIONS

Author: Eric M. Foster Title: ESD Packageing Requirements for an Opto-Electronic Recsiver Module Source: IEEE Transactions on Components, 1990, No. 4, pp. 787-790.

* cited by examiner

*Primary Examiner*—Frank G Font
*Assistant Examiner*—Jerry Blevins
(74) *Attorney, Agent, or Firm*—Timothy M. Morella

(57) ABSTRACT

The invention relates to an optical connector for connecting plastic optical fibers for establishing multimedia connections in motor vehicles according to the MOST® standard with an ESD protection. The object formulated for the invention is to provide a connector which is resistant to voltage flashovers and, in particular, can be handled in a simple manner even after the effect of moisture. The object is achieved by means of an optical connector comprising a dielectric connector housing with a receptacle, an optical connection element and an electro-optical converter, wherein provision is made of at least an electrically conductive protection element against electrostatic discharges in the region of the receptacle.

16 Claims, 13 Drawing Sheets

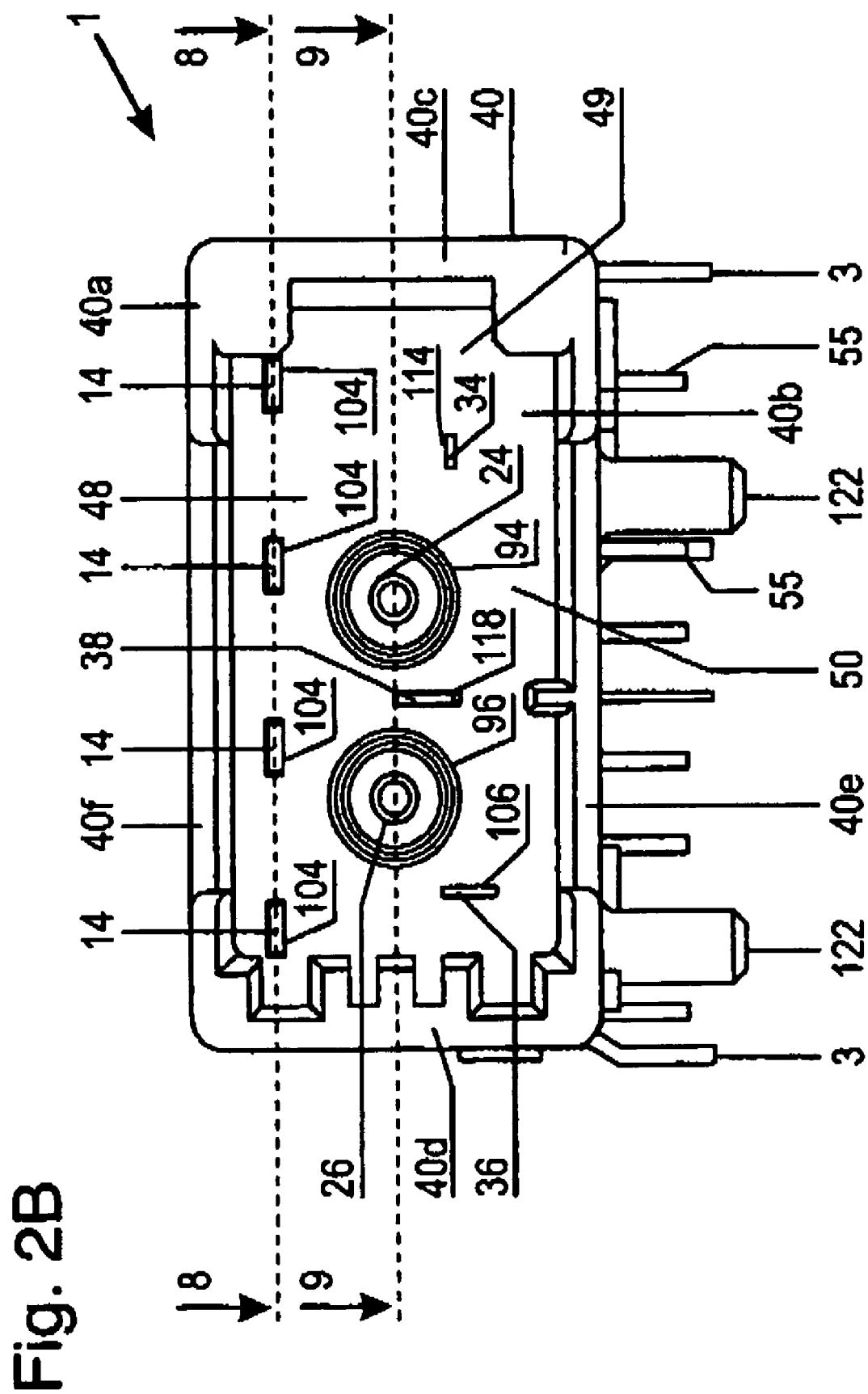

OPTICAL CONNECTOR

FIELD OF THE INVENTION

The invention relates to an optical connector for connecting plastic optical fibers, in general, and for establishing multimedia connections in motor vehicles, e.g. according to the MOST® standard with ESD protection, in particular.

BACKGROUND OF THE INVENTION

On account of the increasing complexity of applications in the area of informational motor vehicle electronics, which in the meantime can be referred to as multimedia, new concepts for networking different devices have become necessary.

By way of example, at least car radio, mobile telephone and navigation system are intended to be able to communicate bidirectionally with one another, so that, e.g. the music reproduction of the car radio is muted and the mobile radio link is operated via the radio loudspeakers if the user would like to use the telephone. It is evident, however, that this is only a very simple application and the multimedia networking of the on-board electronics is subject to virtually no limits for satisfying customers' demands.

In order to meet these complex requirements, optical data transmission has gained acceptance in the meantime for these connections in the area of automotive engineering. A new standard called MOST® has been specifically developed in this regard. The specifications of the MOST® standard have been published inter alia as "MAMAC Specification" Rev 1.0, November 2002, Version 1.0-00 under http://www.most-net.de/downloads/Specifications/MAMACSpecification_IV0-00.pdf and under http://www.mostnet.de/downloads/Specifications/Physical%20Layer%20 Specification/ 010223 WgPhy Drawings.zip. Reference is hereby made to the specifications on which the MOST® standard is based and their contents are incorporated in their entirety in the subject-matter of this disclosure by reference.

A compact type of optical MOST® connectors comprises electro-optical converters fixed to the connector on the rear side. Said connectors contain internally short waveguide sections for the connection of the converters.

It is known to fit an electrical shielding to the housing of the connector in order to protect the sensitive electro-optical converters against electrical discharges when the connector is picked up e.g. by a person. For this purpose, such shieldings are typically applied to the outside of the connector housing and more or less surround the region of the electro-optical converters in the manner of a cage. It is also known to provide the converters with their own metallic housings.

However, these shielding measures, under certain circumstances, do not provide adequate protection against electrical discharges. On the other hand, an electrical discharge in the form of a "flash of lightning" on the electro-optical converter can destroy the latter, which entails a costly repair, typically even the complete replacement of the connector.

In the area of automotive engineering, for example, where such connectors have to withstand the requirements of the tough garage environment, it has been shown that the known protection measures are often inadequate.

In particular, this type of shielding only protects the sensitive components against a discharge externally. However, it provides no protection against a discharge internally in the connector.

From European Patent EP 0 267 074 B1 a protection device for a fiber optic connector against electromagnetic perturbations and electrostatic discharges is known. The document teaches to provide a metal screen between two housings of opto-electronic component and a plate with a metal grounding layer. The metal screen is pierced with apertures for the passage of sockets of the components' housings.

From U.S. Pat. No. 5,499,311 to DeCusatis a receptacle for connecting parallel fiber optic cables to a multichip module comprising a conductive jacket disposed around a receiving body of the connector is known.

From European Patent Application EP 0 921 425 A2 a fiber optic connector with a conductive shield formed around the connector is known.

Disadvantageously, these devices also merely protect against influences from outside.

However, in the context of the present invention, it has been found by the inventor that an electrical flashover to the optical fiber sections inserted in the connector can take place and can be forwarded via said fiber sections to the electro-optical converters if, by way of example, an electrostatically charged person inserts a finger into the interior of the connector and touches or just comes close to the optical fiber sections.

This risk may on first impression appear to be insignificant since the optical fibers are composed of plastic, having an extremely low conductivity.

However, even the conductivity of the plastic fiber section e.g. at its surface may suffice if the flashover voltage is high enough.

This risk occurs in particular in the case of MOST® connectors, as the fiber section in these connectors is inserted into a plastic sleeve. Furthermore, in the area of automotive engineering the connector may be exposed to moisture that may collect between the fiber section and the sleeve and may increase the conductivity by orders of magnitude. This considerably increases the risk of a voltage flashover to the converter.

All in all the previously known solutions in this regard are subject to improvement. On the other hand, in this competitively contested market, even apparently slight qualitative and/or cost-related advantages often suffice to obtain a decisive lead over the competitors in the market.

SUMMARY OF THE INVENTION

Therefore, an object of the invention is to provide an optical connector which is robust to withstand even difficult conditions of use and, in particular, is resistant to voltage flashovers.

A further object of the invention is to provide an optical connector which can be handled in a simple manner even after the effect of moisture.

Another object of the invention is to provide a simple, cost-effective optical connector which has a long life expectancy.

Yet another object of the invention is to provide an optical connector which avoids or at least reduces the disadvantages of known connectors.

The object of the invention is already achieved in a surprisingly simple manner by the subject-matter of the independent claims. Advantageous embodiments of the invention are defined in the dependent claims.

The optical or electro-optical connector according to the invention is designed in particular according to the MOST® standard for establishing multimedia connections in a motor vehicle. It comprises at least a dielectric connector housing, preferably made of plastic with a receptacle for a complementary connector, into which the complementary connector can be introduced or inserted. However, the invention can also be applied to the complementary connector in a corresponding manner if a discharge protection appears appropriate in that case.

At least one optical connection element for mating connection with a complementary optical connection element of the complementary connector is situated in the interior of the connector, more precisely in the connector housing, or in the receptacle. The connection element is formed e.g. by a guide sleeve which is formed in one piece with the housing and in which a short plastic optical fiber section is fixed. In this case, the connection element projects relatively far (for instance almost 1 cm) into the receptacle, which initially increases the risk of flashover.

Furthermore, the connector comprises at least one electro-optical component, e.g. an electro-optical converter—also called fiber-optic transceiver (FOT)—with electronic circuits. In this case, in the case of this particular form of MOST® connector—also referred to as a compact connector—the transceiver is mounted and/or fixed immediately or directly on the connector housing, more precisely on its rear side, so that it forms a part of the compact connector and can be soldered together with the latter onto a circuit board.

According to the invention, electrostatic discharge (ESD) protection means are provided by at least one electrically conductive ESD protection element which ESD protection element preferably penetrates the connector housing from the rear side and functions according to the principle of a lightning arrester, that is to say dissipates voltage flashovers to ground in a defined manner. For this purpose, the ESD protection element is preferably grounded when the connector is mounted on a circuit board. The ESD protection means comprises at least one discharge section projecting towards the receptacle, such that a lightning-attracting section of the ESD protection element is arranged in the region of the rearward end of the receptacle, in such a way that an effective discharge is provided within the receptacle.

Thus, a major advantage of the connector according to the invention is the provision of ESD protection in the interior of the connector, more precisely in the receptacle for the complementary mating connector.

In an advantageous manner, an electrical discharge can thus take place via the ESD protection element that is grounded in an operating or mounted condition, instead of via the optical fiber sections, so that the transceivers are effectively protected against overvoltage or ESD.

It may initially appear nonsensical to provide an optical connector with an ESD protection of this type, but this is extremely advantageous on account of the integrated transceivers.

The protection element preferably comprises an electrically conductive, in particular metallic discharge finger with a discharge section that is free or is situated at a free end of the discharge finger. The discharge section may also be designated as a discharge tip in the sense of a lightning arrester, in which case this designation should not be interpreted restrictively to the effect that the tip has to have a particularly pointed form. Experiments have shown that strips with a relatively blunt front face which are stamped from metal sheet also provide a sufficient security, in which case the sharp-edged burrs that naturally arise in the course of stamping can even be utilized advantageously for the invention since they may result in the electric field strength being increased.

For this purpose, the discharge section is exposed to the interior of the receptacle providing a discharge tip in or directly at the mating connector receiving cavity and is arranged in particular in the vicinity of the optical connection element, in particular next to the optical connection element, in such a way that the discharge finger protects the optical connection element against an electrical voltage flashover from the interior of the receptacle. Such discharge fingers can be produced simply and cost-effectively by stamping and forming/bending, but on the other hand can also be adapted flexibly to the respective requirements.

The discharge section of the ESD protection element preferably extends essentially parallel to the introduction direction of the complementary connector, so that its front face or edge faces the receptacle in order to dissipate the voltage flashovers.

The receptacle is preferably formed as a cavity which has, at a front side of the connector housing or the cavity, an opening for the introduction of the complementary connector (introduction side). In this case, the discharge finger is arranged at a rear side of the cavity opposite to the front side, thereby ensuring the proximity to the optical connection element.

The connector housing is furthermore formed by two side walls, a bottom, a cover and a rear wall, which are all injection-moulded in one piece and the rear wall of the housing simultaneously forms the inner rear wall of the cavity. The protection element is then inserted into the inner rear wall at least by its discharge section counter to the introduction direction of the complementary connector and preferably extends at least to the front side of the inner rear wall in order to terminate flush with the latter.

This avoids a risk of injury and nevertheless ensures a sufficient discharge protection.

In accordance with a preferred embodiment of the invention, the protection element comprises one or more electrically conductive discharge fingers with a projecting discharge section in each case, the discharge sections engaging in openings in the inner rear wall and thus penetrating the connector housing or the rear wall thereof.

The protection element particularly preferably has a plurality of, e.g. at least two or three, discharge fingers extending in different directions, so that a wide region can be covered laterally.

At least some of the discharge fingers are preferably formed by in each case an arm section extending transversely with respect to the introduction direction of the complementary connector, a connecting section at which the arm section is suspended, and by the discharge section adjoining the arm section. Consequently, the discharge sections are advantageously arranged at different lateral locations (transversely with respect to the introduction direction).

The MOST® connector typically has a first and second electro-optical component. In the case of a preferred embodiment in this regard, it has proved to be advantageous to assign a dedicated discharge finger to each electro-optical component. In particular, the arm sections of the first and second discharge fingers in this case extend along a front side of the associated electro-optical component, thereby achieving a large-area discharge protection.

It is particularly advantageous for the first and second discharge fingers, more precisely the arm sections thereof, to be offset vertically or transversely with respect to the introduction direction. This achieves a double benefit to the effect that the discharge fingers can be stamped in one piece from a metal sheet and, secondly, the protected region is enlarged. Accordingly, the discharge fingers are preferably formed asymmetrically with respect to each other.

In accordance with a particularly preferred embodiment, the protection element has at least three discharge fingers with in each case at least a discharge section or tip. Furthermore, the first optical connection element is arranged between a first and a third of the discharge sections, the second optical connection element is arranged between a second and the third of the discharge sections, and the third discharge section is arranged between the first and second optical connection elements. Consequently, discharge sections and optical connection elements alternate with regard to the lateral arrangement, so that both connection elements are framed by discharge sections on both sides. In the case of this embodiment, the discharge sections extend through openings in the inner rear wall, the openings being laterally adjacent to the optical connection elements.

Preferably, the first discharge finger is bent to a first side and the second discharge finger is bent to an opposite, second side. The third discharge finger further extends essentially rectilinearly counter to the introduction direction between the first and second discharge fingers, with the result that a tripod is formed in the case of which, however, the three discharge sections extend parallel to one another in the insertion direction and also essentially perpendicular to the arm sections of the first and second discharge fingers.

For simple grounding, the protection element has a dedicated connection element, e.g. a soldering pin on its underside for connection to a circuit printed board.

The connector further preferably has an external electrical shielding for EMI (electromagnetic interference) protection, preferably with dedicated connection elements or soldering pins. The shielding is designed in particular in the form of an essentially U-shaped clamp which engages around the connector housing rearwards and is releasably latched thereto and which, if appropriate, is electrically connected to the ESD protection element.

It is particularly simple to arrange the ESD protection element centrally at least in sections between the optical connection elements within the U-shaped clamp. In particular, the protection element is formed separately from the shielding and/or separately from metallic housings of the electro-optical converters.

As a result of the modular construction, the parts can be mounted independently of one another as follows. Firstly, the connector housing is provided and the ESD protection element is plugged onto the connector housing from the rear, counter to the introduction direction of the complementary connector. The electro-optical converters are subsequently introduced with their optical fiber sections into corresponding guide sleeves in the connector housing and the shielding is subsequently fixed to the connector housing.

Particularly preferably, the external shielding also has one or more discharge sections which engage in openings in the inner rear wall and/or penetrate the latter and thus provide further "lightning arresters" in the interior of the connector. In particular, a section, more precisely a covering section, of the external shielding is angled away from the shielding in order to extend counter to the introduction direction with the discharge section up to or into the cavity. Therefore, the external shielding also provides ESD protection capabilities in the sense of this description.

In accordance with a further preferred embodiment, the clamp has press-on lugs which are integrally formed by stamping-out and are biased against the rear side of the electro-optical components in order to apply force to the latter counter to the introduction direction. This ensures the quality of the optical connection.

The invention is explained in more detail below on the basis of an exemplary embodiment and with reference to the drawings, identical and similar elements being provided in part with identical reference symbols.

BRIEF DESCRIPTION OF THE DRAWINGS

In the figures:

FIG. 2B is like FIG. 2A with the connector housing.

DETAILED DESCRIPTION OF THE INVENTION

Figure 1A:
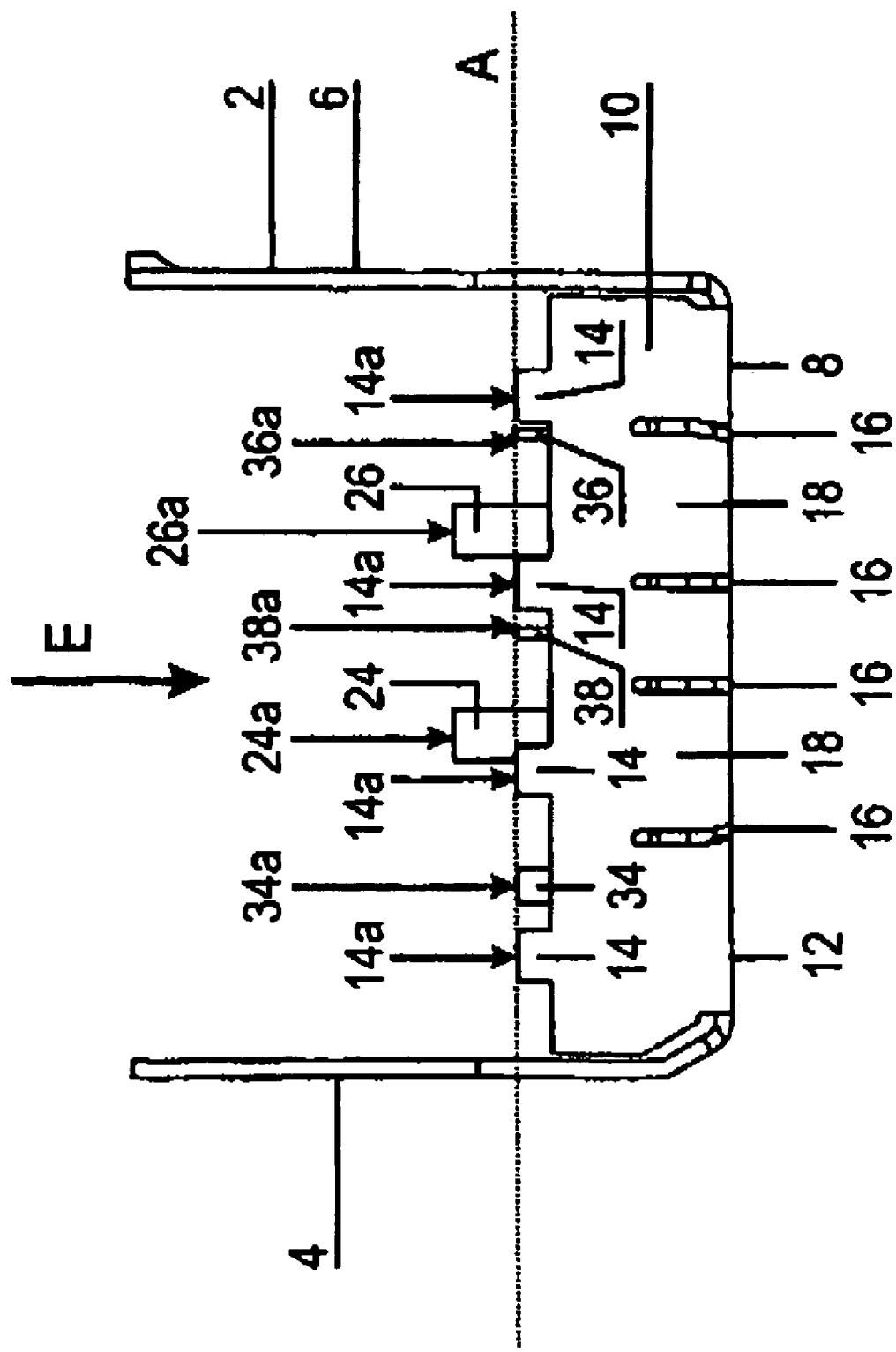
FIG. 1A is a top plan above of the U-shaped clamp with inserted electro-optical converters including fiber sections and an embodiment of the ESD protection element.

FIG. 1A shows an external shielding in the form of a U-shaped shielding clamp 2 having a left-hand and right-hand side arm 4, 6 and a rear section 8, which is connected in one piece with the side arms. A horizontal covering section 10 is suspended on the rear section 8 and is connected to the rear section 8 in one piece along an edge 12.

The clamp or clip 2, more precisely the covering section 10, has at least one discharge section 14, in this exemplary embodiment a plurality of four discharge sections 14, which extend from the covering section 10 horizontally counter to the introduction direction E of the complementary connector (not illustrated). The discharge sections 14 are essentially formed as rectangular projections that are suspended on the rear side and are otherwise cantilevered.

The clamp 2 further has four stamped slots 16, which extend from the covering section 10 around the edge 12 right into the rear section 8 in order to form two self-supporting resilient press-on lugs 18.

FIG. 1A further shows two optical fiber sections 24, 26 and three discharge sections 34, 36, 38 of ESD protection element 30 in the form of an internal overvoltage arrester.

The respective front faces or edges 14a, 34a, 36a and 38a of the discharge sections 14, 34, 36 and 38, respectively, run flush in a lateral plane A that is set back with regard to the front sides 24a and 26a of the optical fiber sections 24 and 26. The setting back preferably amounts to 1 mm to 10 mm, in this example approximately 2.5 mm.

Figure 1B:
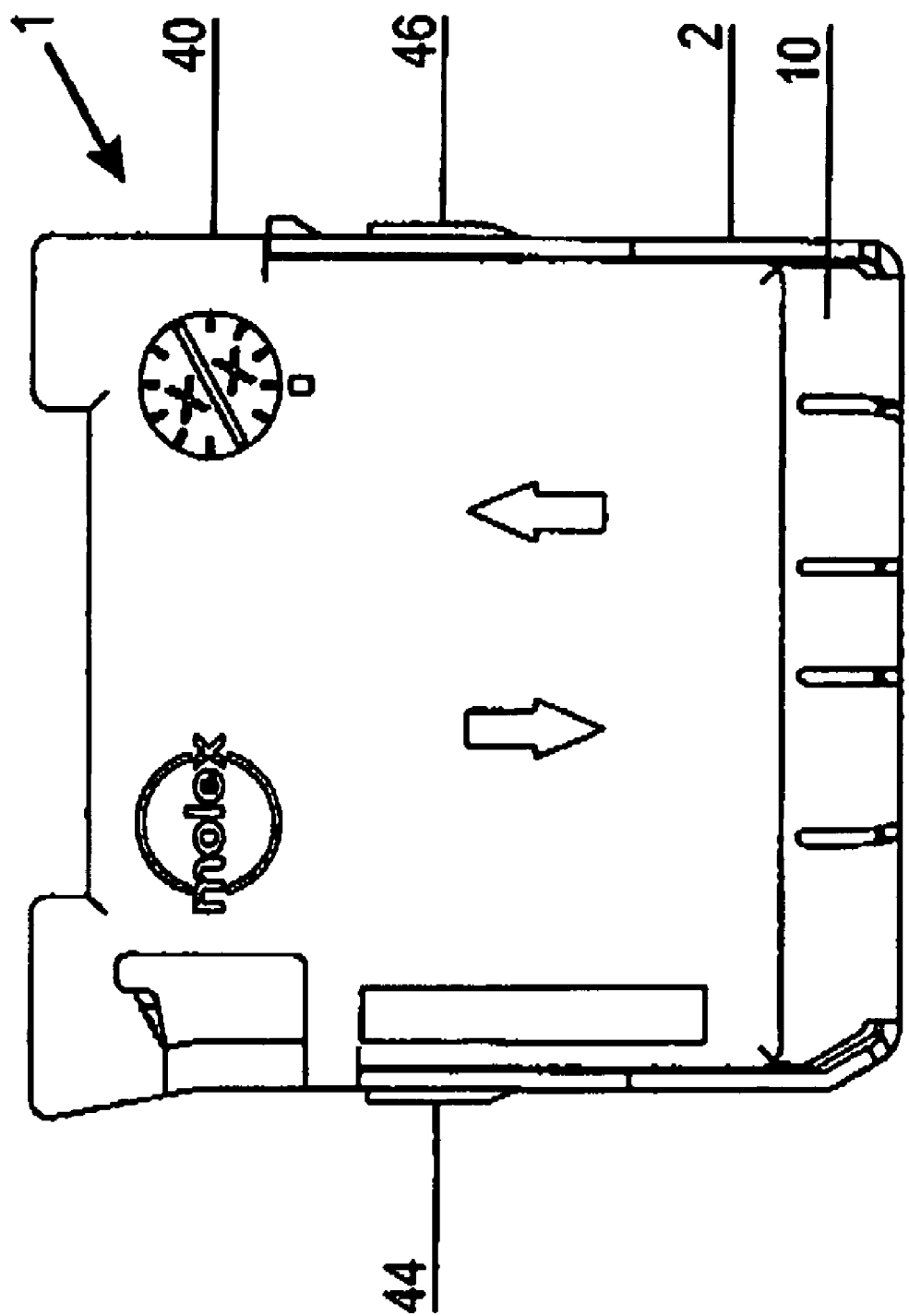
FIG. 1B is like FIG. 1A with the connector housing.

Referring to FIG. 1B, the illustration shows the connector 1 comprising the stamped and formed clamp 2 together with a dielectric connector housing 40 around which the clamp 2 engages on the rear side. The lateral arms 4, 6 of the clamp 2 are latched to the connector-housing 40 by means of lateral latching tabs 44, 46.

Figure 2A:
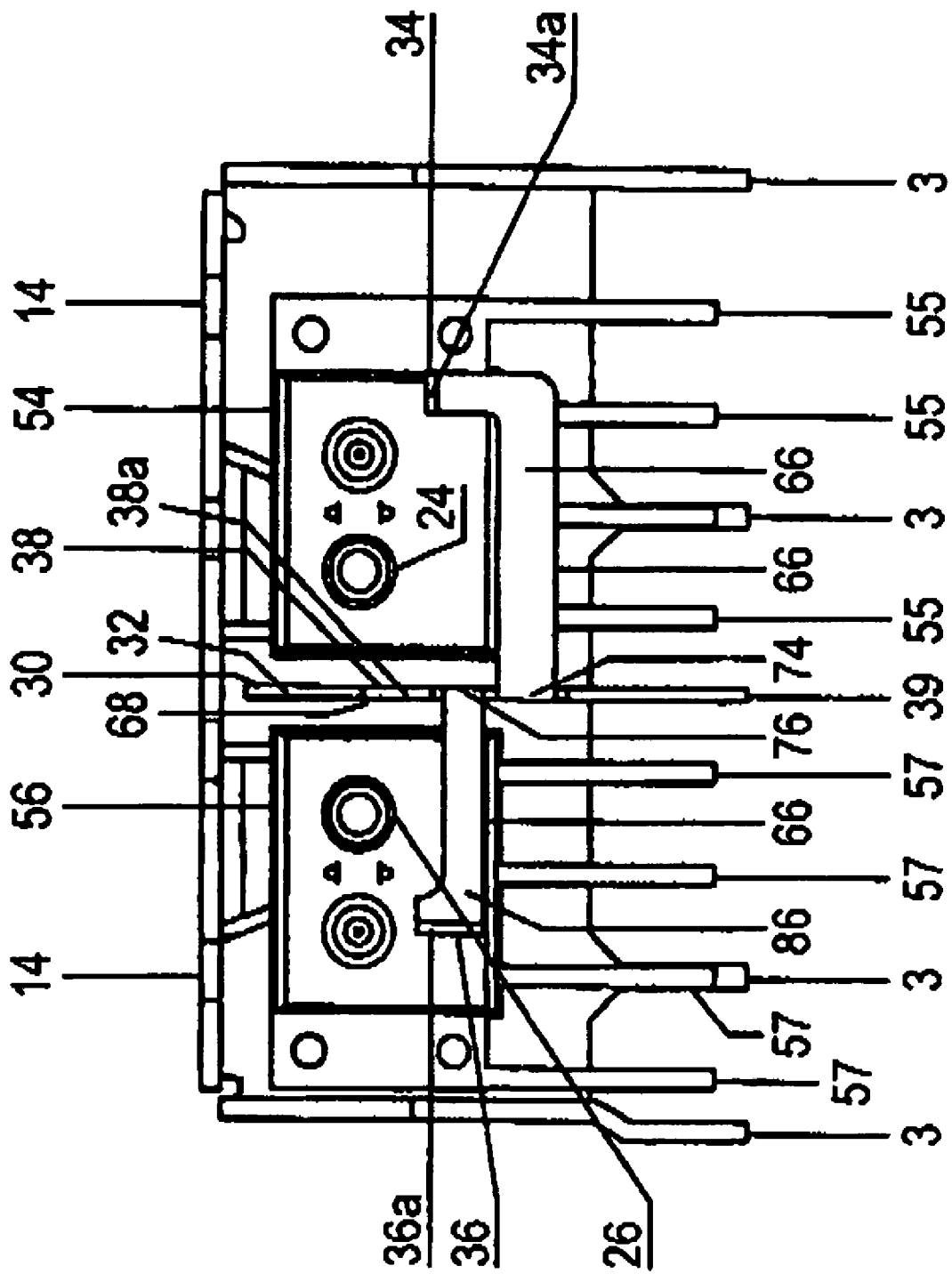
FIG. 2A is a front view of the arrangement from FIG. 1A.

Referring to FIG. 2A, the illustration shows two electro-optical converters 54, 56 with in each case a plurality of soldering pins 55 and 57, respectively.

The metallic ESD protection element 30 is partly arranged centrally between converters 54, 56 and has a first discharge finger 64 with a connecting section 74 angled away by 90°, with a first arm section or leg 84 and the terminating discharge section 34. The leg 84 of the first discharge finger is stamped in an L-shaped manner.

The internal ESD protection element 30 furthermore has a second discharge finger 66 with a connecting section 76 angled away by 90°, with a second arm section or leg 86 and the terminating discharge section 36. The first and second legs 84, 86 are transversely oriented oppositely and vertically offset with respect to one another.

The two arm sections 84, 86 are stamped out in the form of narrow strips.

The ESD protection element 30 further comprises a rectilinear third discharge finger 68, which extends perpendicular to the plane of the drawing in FIG. 2A and is arranged between the first and second discharge fingers 64, 66 and is suspended on a body section 32 of the ESD protection element 30 above the first and second discharge fingers.

The ESD protection element 30 has a lower soldering pin 39, which is connected to the three discharge fingers 64, 66, 68 by means of the body section. The clamp 2 also has four dedicated soldering pins 3, the soldering pins 3 and 39 being made somewhat longer than the soldering pins 55 and 57.

The first and second legs 84, 86 extend at least partly in front of the associated converter 54, 56, so that the ESD protection element 30 itself also forms an electrical shielding.

FIG. 2B shows the connector 1 with the plastic connector housing 40 having an opening 48 in its front side 40a. The opening 48 clears the way into a cavity 49 in the connector housing 40, thereby forming a receptacle 50 for mating connection with a complementary connector (not shown).

Arranged in the cavity 49 are two optical connection elements 94, 96 in the form of cylindrical connection sleeves with the optical fiber sections 24, 26 introduced therein, the connection sleeves being formed in one piece with the connector housing 40.

The connector housing 40 is formed in one piece by the front side 40a, a rear wall or inner rear wall 40b, two side walls 40c, 40d and also a bottom 40e and a cover 40f. A front side 41—facing the cavity 49—of the rear wall 40b forms the rearward boundary of the cavity 49 in this case.

The cavity 49 extends from the front side 40a as far as the rear wall 40b of the connector housing 40. Furthermore, the two optical connection elements 94, 96 project from the rear wall 40b into the cavity 49. For connection purposes, a section of the complementary connector is inserted through the opening 48 into the cavity 49.

The rear wall 40b has four elongate, rectangular openings 104 which are arranged in a horizontal line and which are arranged above the optical connection elements 94, 96 and into which the discharge sections 14 of the clamp 2 engage or project. Moreover, three further openings 114, 116 and 118 are present in the rear wall 40b, into which the discharge sections 34, 36 and 38, respectively, of the ESD protection element 30 engage or project. Consequently, both the discharge fingers 64, 66 and the shielding 2 penetrate the rear wall 40b of the connector housing 40.

The first opening 114 is arranged diagonally on the right below and the second opening 116 diagonally on the left below the connection elements 94, 96 and the third opening 118 is arranged between the connection elements 94, 96, with the result that an areal protection is obtained and a secure dissipation is ensured, irrespective of the location at which somebody e.g. inserts a finger into the cavity 49.

Figure 3A:
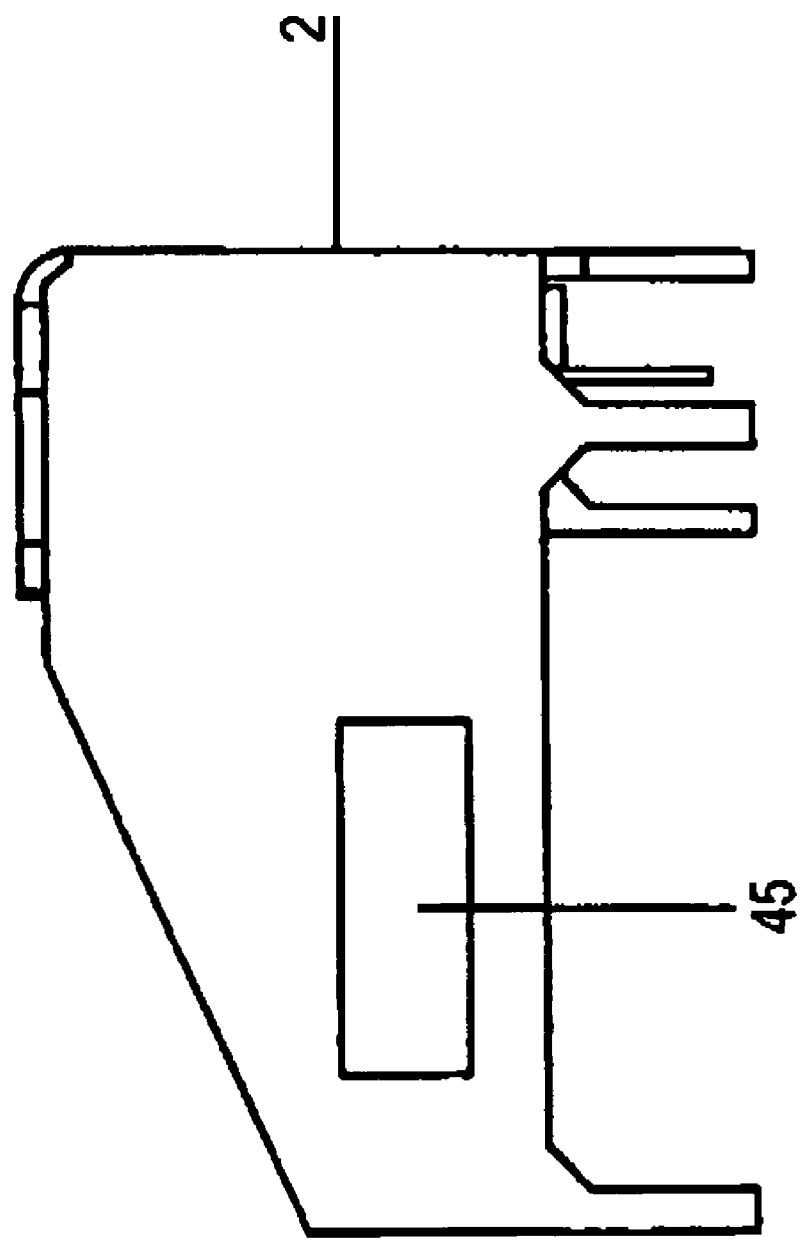
FIG. 3A is a side view of the arrangement from FIG. 1A.

Referring to FIG. 3A, the illustration shows a lateral latching opening 45 in the clamp 2.

Figure 3B:
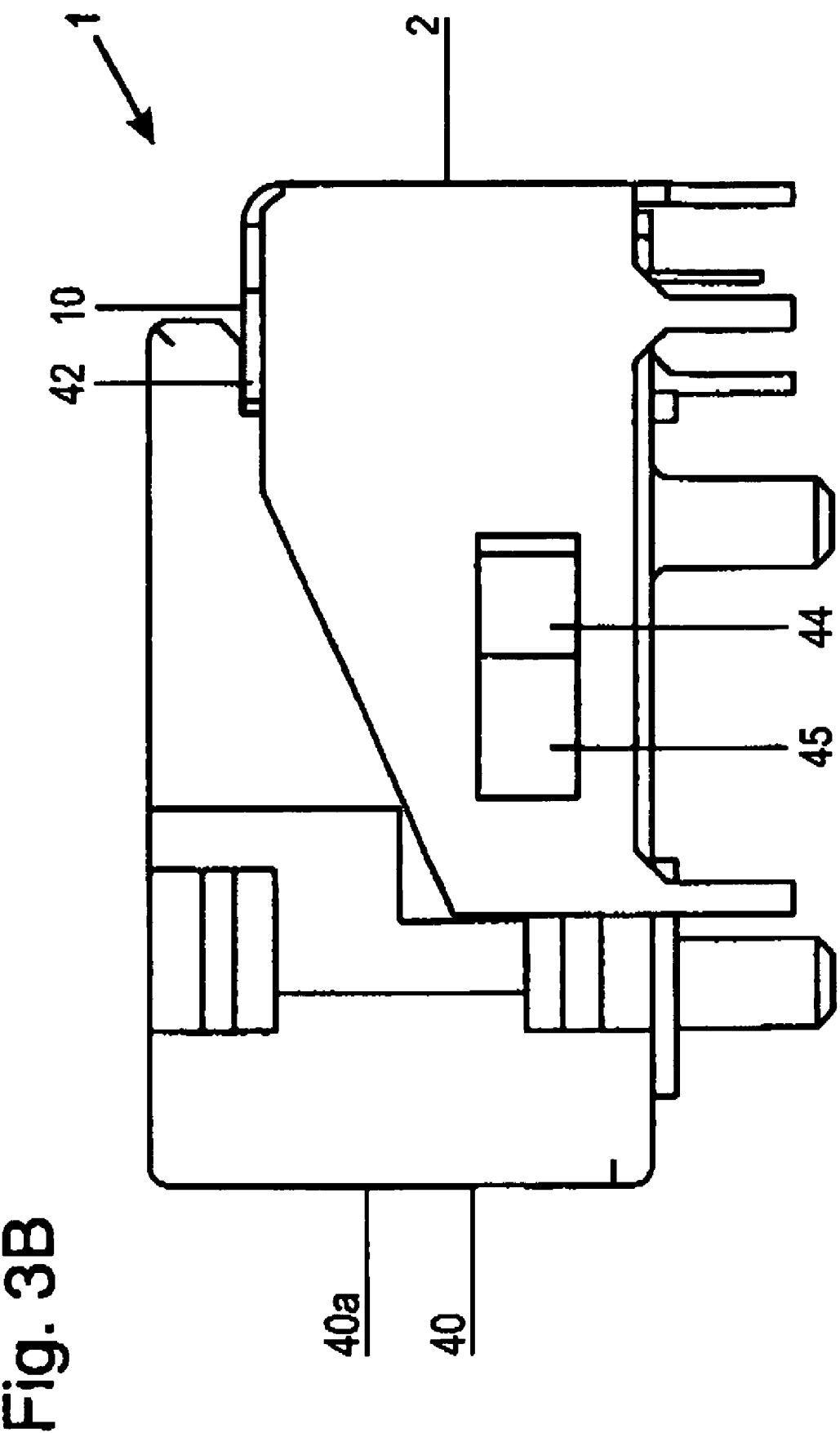
FIG. 3B is like FIG. 3A with the connector housing.

Referring to FIG. 3B, it can be seen that the covering section 10 of the clamp 2 engages horizontally into a slot 42 in the housing 40.

Figure 4A:
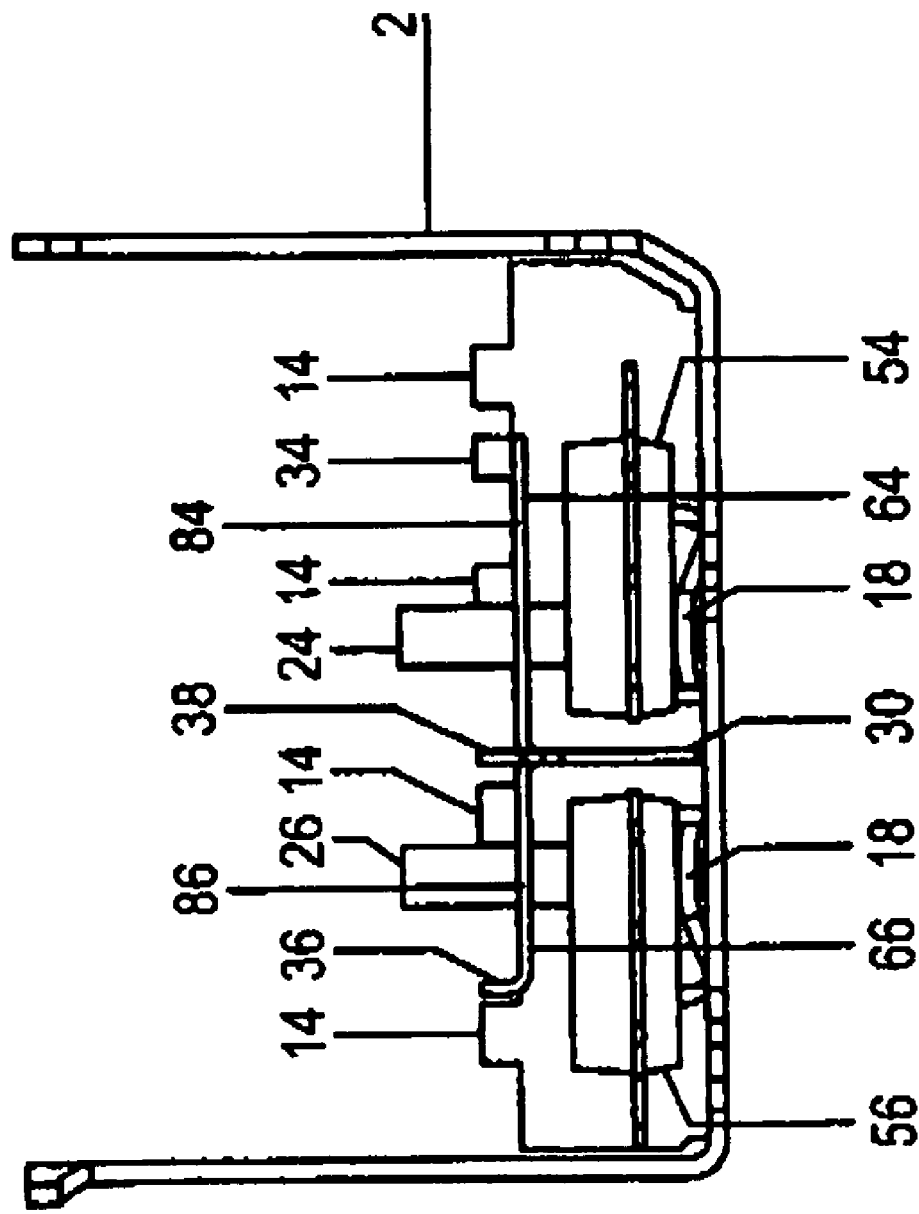
FIG. 4A is a bottom plan view below of the arrangement from FIG. 1A.

Referring to FIG. 4A, the illustration shows that the converters 54, 56 are arranged at least partly between the arm sections 84, 86, on the one hand, and the rear section 8 of the clamp 2, on the other hand.

The ESD protection element 30 is arranged outside the housing 40 at least in sections. In particular, the body element 32 and the arm sections 84, 86 are situated outside the housing 40.

Figure 4B:
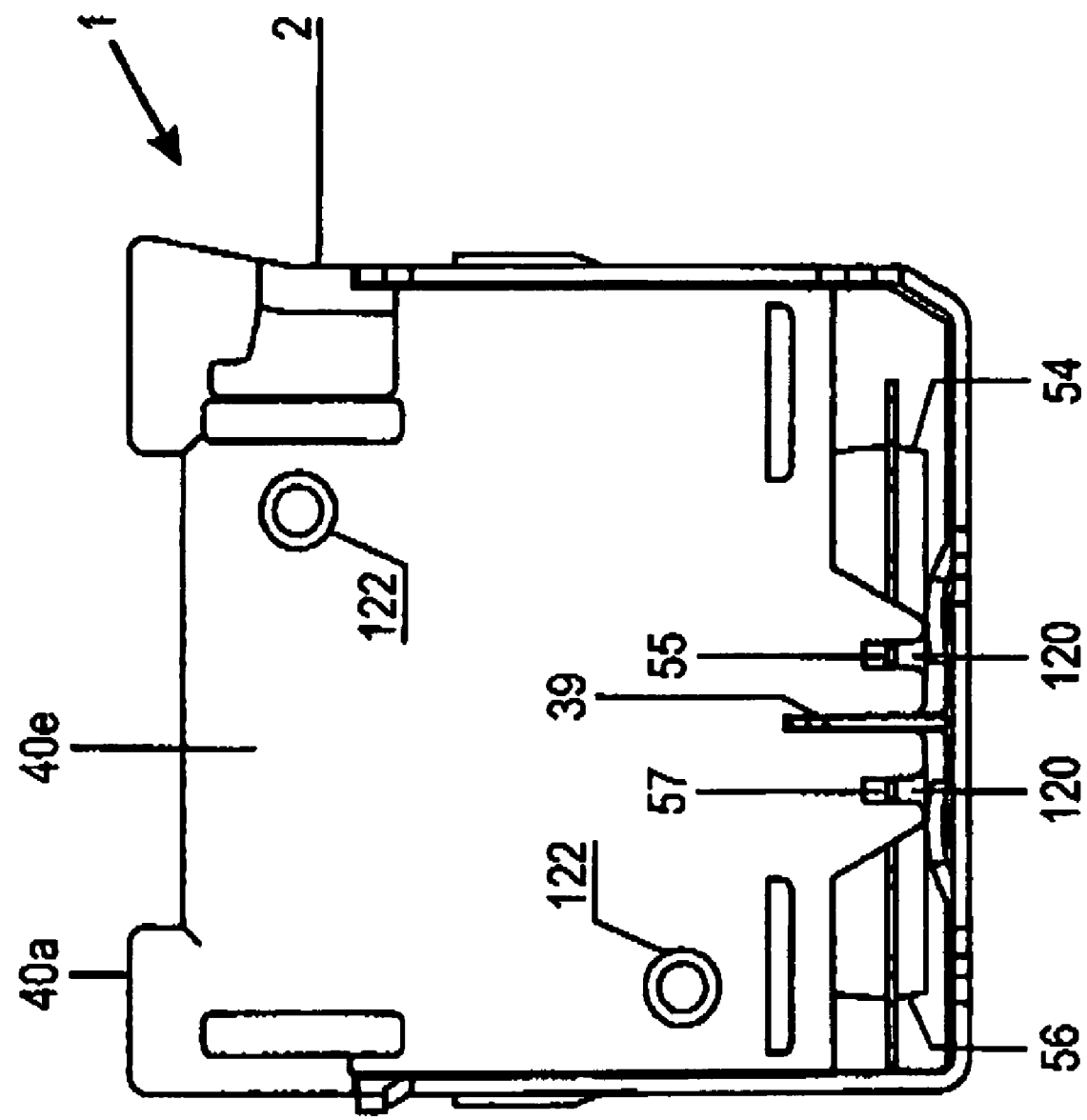
FIG. 4B is like FIG. 4A with the connector housing.

Referring to FIG. 4B, it can be seen that the press-on lugs 18 press the converters 54, 56 against the rear wall 40b of the housing 40 counter to the introduction direction E.

The bottom 40e of the housing 40 furthermore has recesses 120, for guiding at least some of the soldering pins 55, 57 and also mounting posts 122 for fixing to a circuit board (not illustrated).

Figure 5:
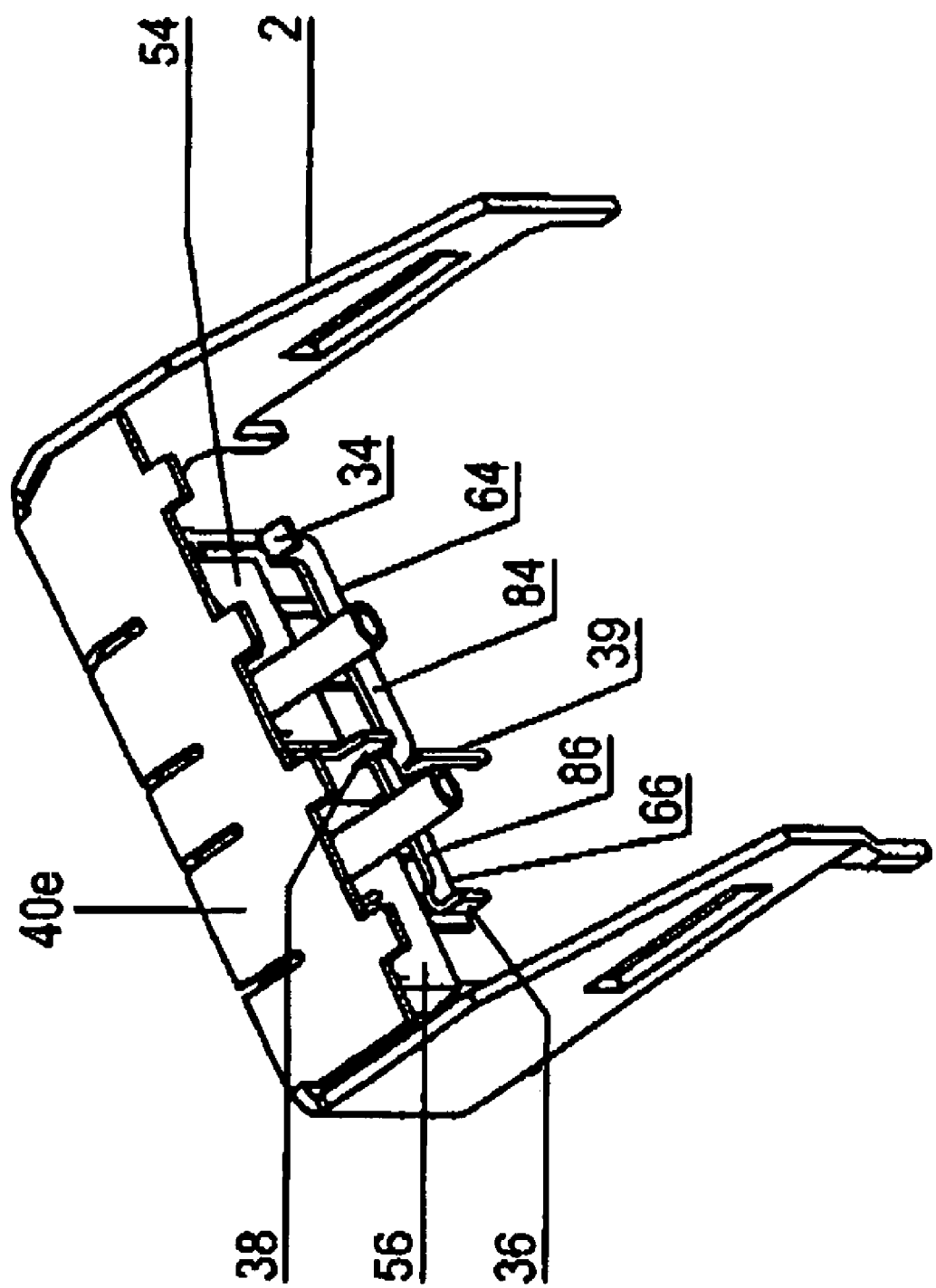
FIG. 5 is a perspective view of the arrangement from FIG. 1A diagonally from the front and above.
Figure 6:
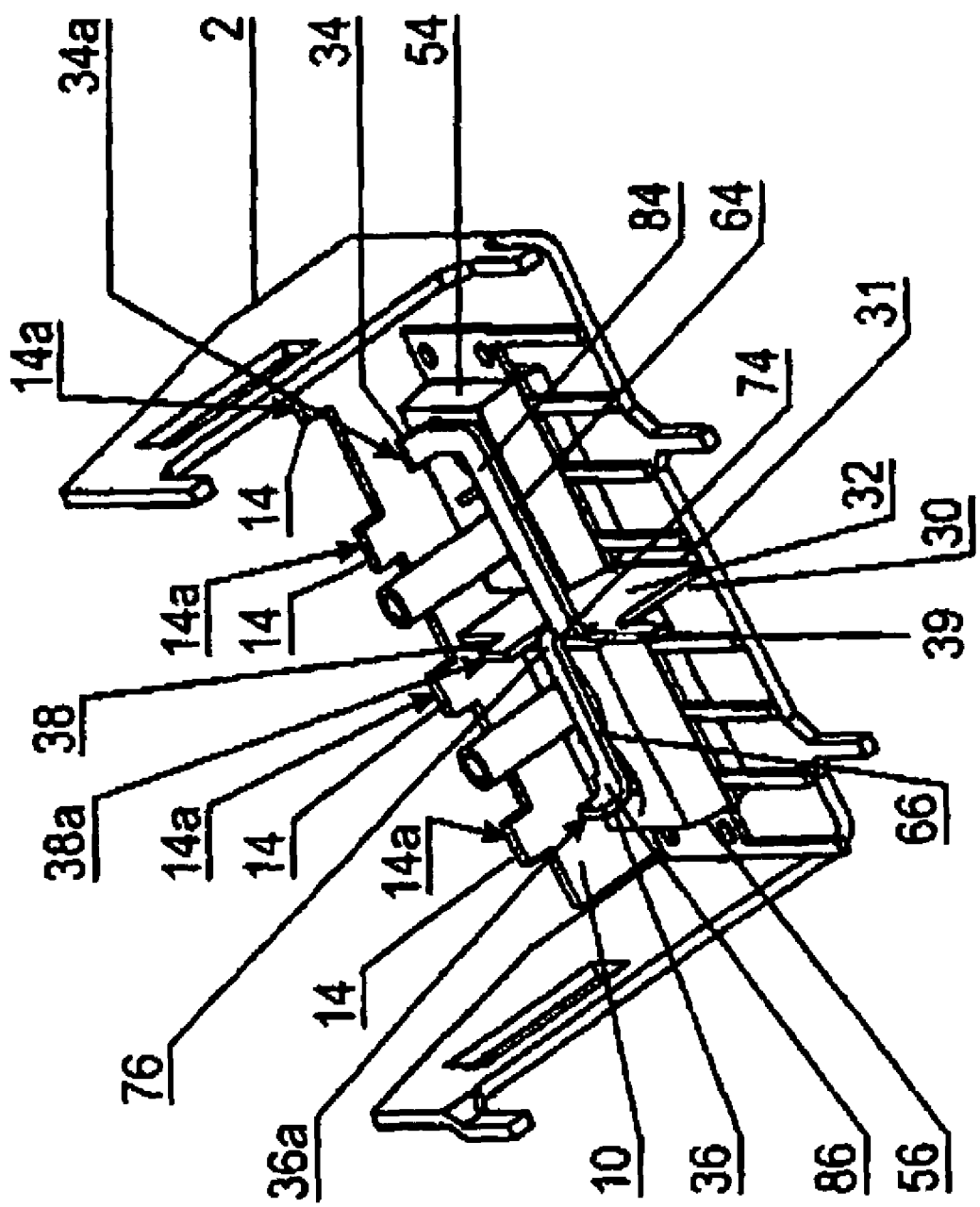
FIG. 6 is a perspective view of the arrangement from FIG. 1A diagonally from the front and below.
Figure 7:
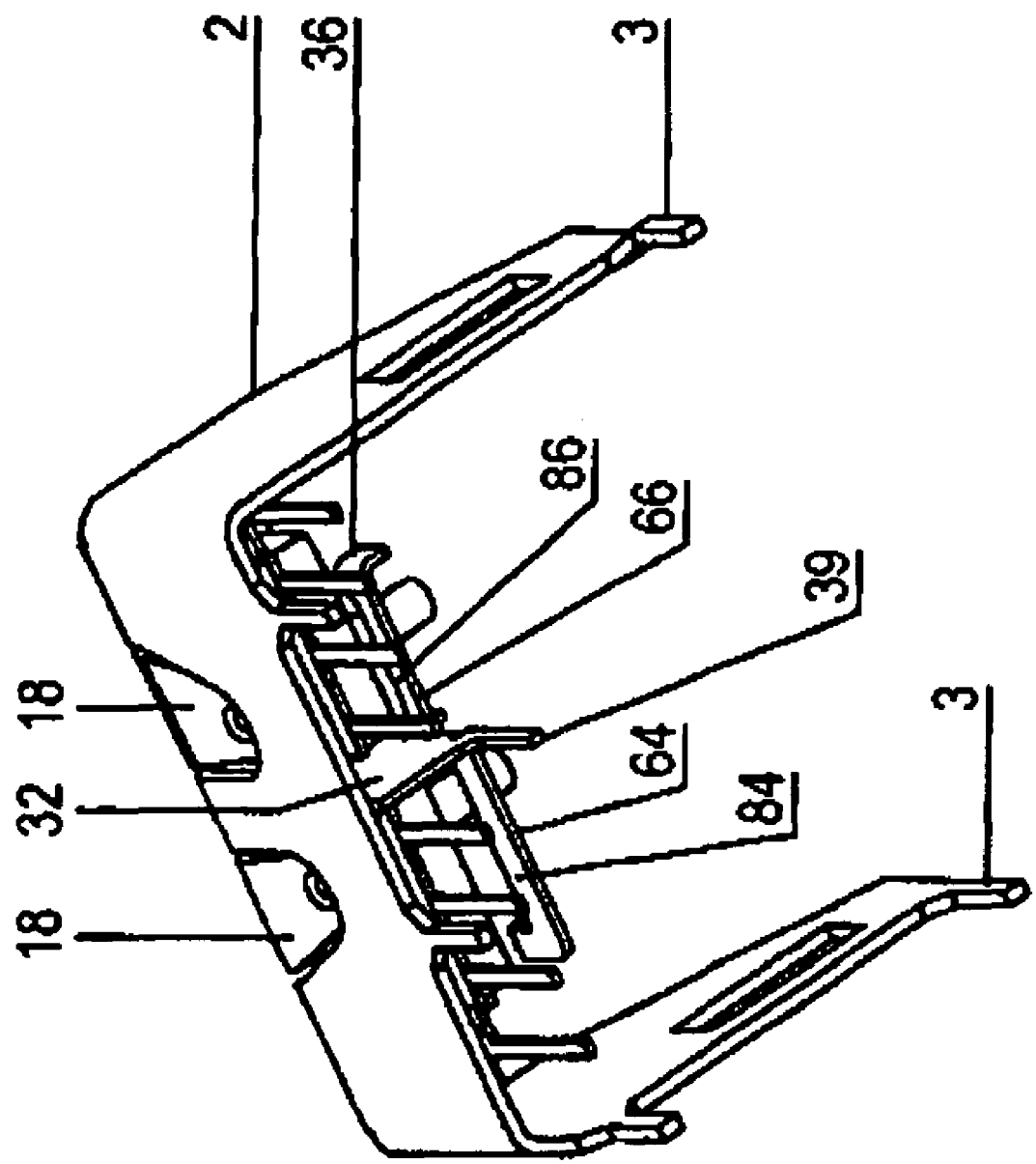
FIG. 7 is a perspective view of the arrangement from FIG. 1A diagonally from the rear and below.

Referring to FIGS. 5 to 7, it can be seen best in the perspective views that the ESD protection element 30 defines a tripod by means of the three discharge fingers 64, 66, 68. In other words, the two outer discharge fingers 64 and 66 are bent away like wings from the body element 32, the body element 32 being formed by an essentially rectangular place which connects the soldering pin 39 and the three discharge fingers 64, 66, 68 to one another in one piece.

A rearward edge 31 of the body element 32 runs along the rear section 8 of the clamp 2, it being possible, if appropriate, for an electrical contact between the ESD protection element and the shielding to be established.

Figure 8:
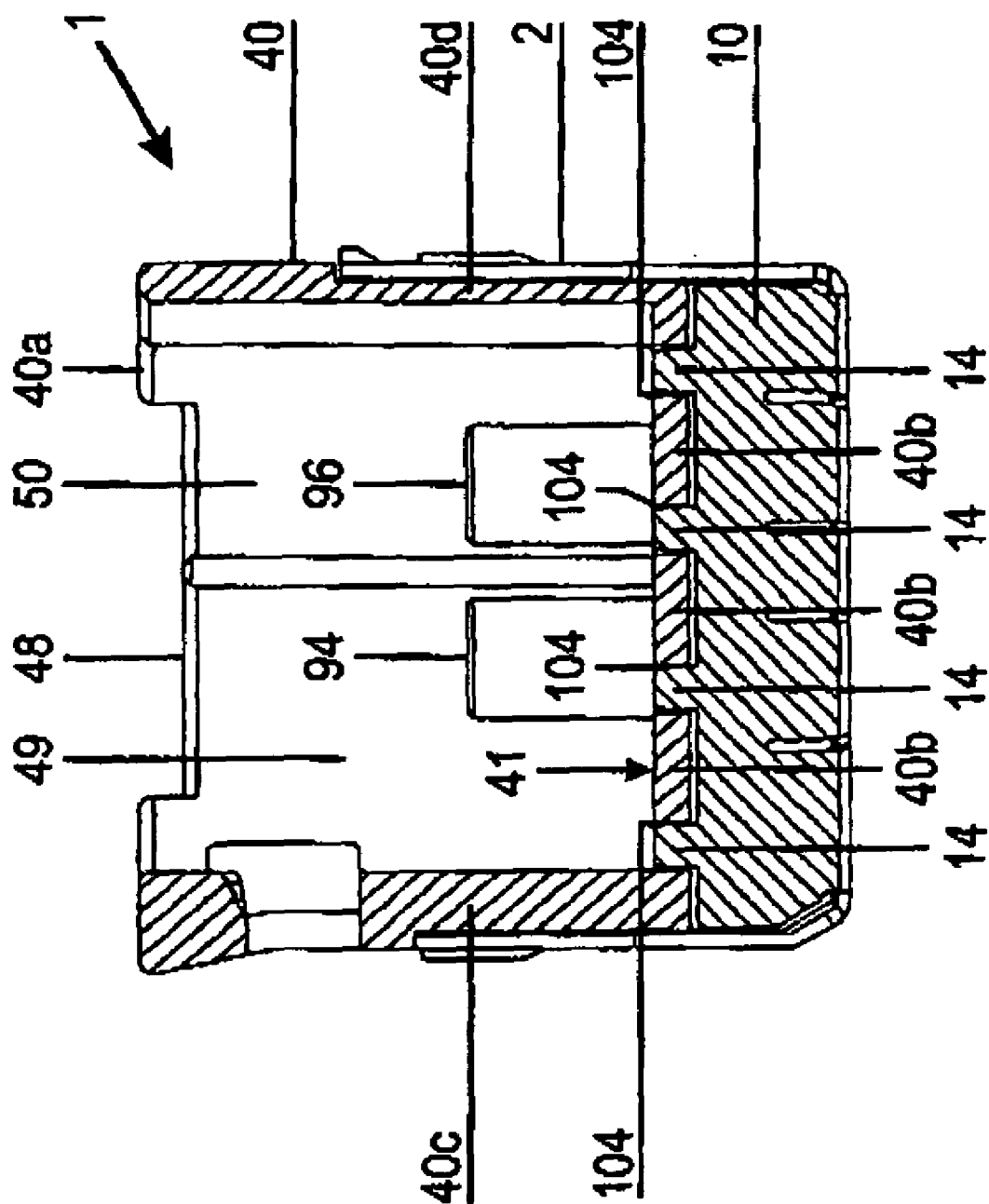
FIG. 8 is a horizontal section taken generally along the line 8-8 in FIG. 2B.
Figure 9:
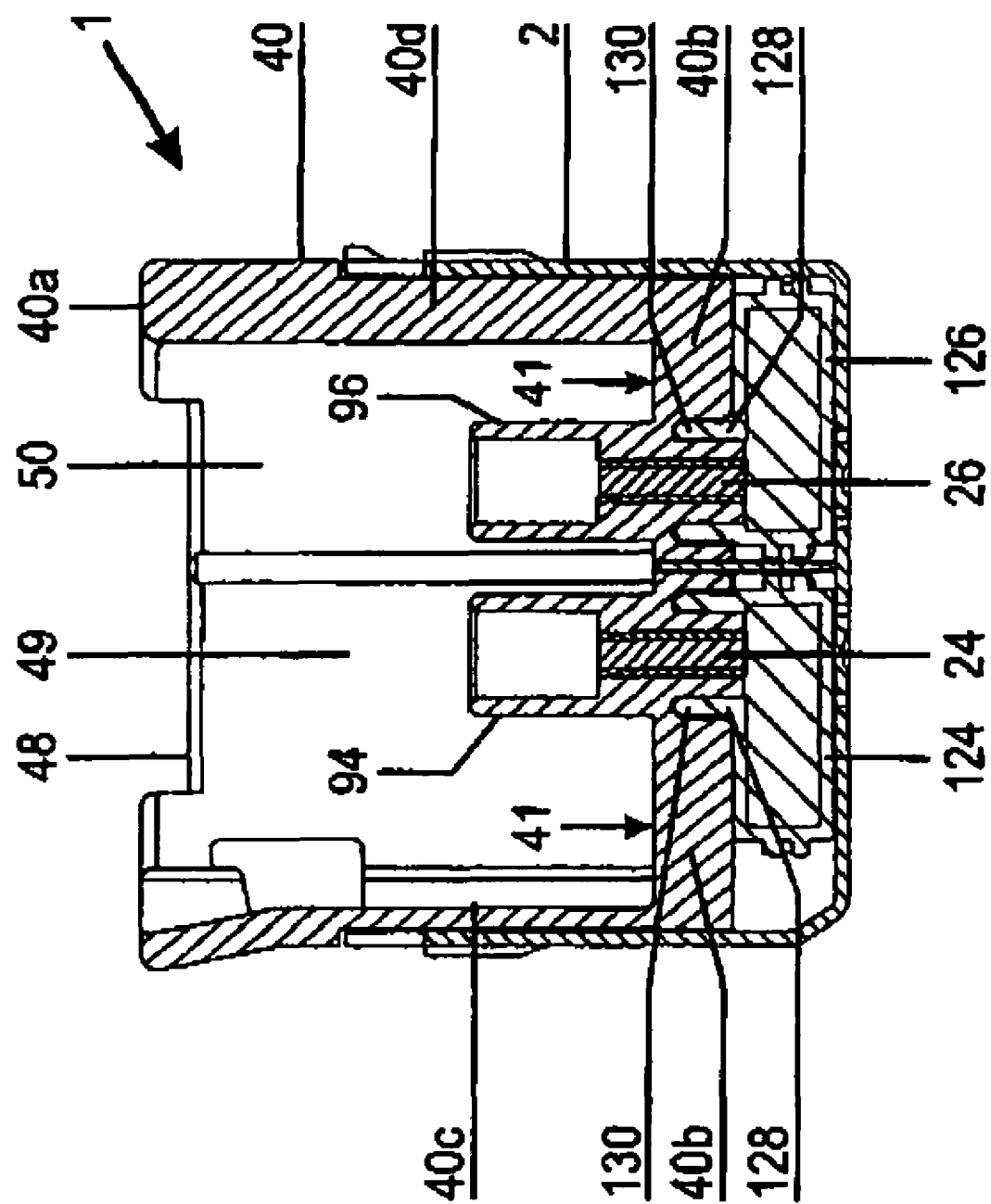
FIG. 9 is a horizontal section taken generally along the line 9-9 in FIG. 2B.

Referring to FIGS. 8 and 9, horizontal sections through the connector 1 are illustrated, which show the discharge sections 14 which engage into the openings 104 and, on the front side, are flush with one another and with the front side 41 of the rear wall 40b.

Furthermore, the optical fibers 24, 26 are readily discernible; they are pressed into the connection elements 94 and 96, respectively.

The converters 54, 56 are furthermore surrounded by converter housings 124, 126 which engage with in each case two front-side guide arms into corresponding recesses 130 in the rear wall 40b of the converter housing 40.

The above-described connector 1 with improved ESD protection capabilities was tested by means of a test finger at 16 kV to the effect that the latter was introduced into the cavity 49 until a flashover with respect to the discharge sections took place. The FOTs were advantageously not destroyed.

It is clear to the person skilled in the art that the embodiments described above are to be understood by way of example, and the invention is not restricted thereto, but rather can be varied in diverse ways without departing from the spirit and scope of the invention.

The invention claimed is:

1. An optical connector for establishing multimedia-connections in a motor vehicle, the optical connector comprising:
  a dielectric connector housing, the dielectric connector housing forming a receptacle for a mating connection with a complementary connector, the receptacle of the dielectric connector housing being formed by sidewalls and a rear wall of the dielectric connector housing, the rear wall having openings therein;
  at least one optical connection element arranged in the receptacle, each optical connection element including an optical fiber section for mating connection with a complementary optical connection element of the complementary connector;

at least one electro-optical component arranged on a rear side of the rear wall opposite to the receptacle, each electro-optical component including electronic circuits; and ESD protection means, the EDS protection means comprising:
at least one discharge section projecting towards the receptacle and having a free end being exposed to the interior of the receptacle to provide an ESD protection within the receptacle; and
at least one electrically conductive discharge finger penetrating the rear wall through the opening and terminating in the discharge section;

wherein said the discharge section is arranged in the vicinity of the optical connection element in such a way that the discharge finger forms a lightning arrester for protection of the optical connection; and wherein the optical connector includes an external electrical shielding which penetrates the connector housing.

2. The optical connector according to claim 1:
further including a U-shaped shielding clamp having at least one discharge section having a front edge;
wherein each discharge section of the ESD protection means also has a front edge; and
wherein all front edges run flush in a lateral plane set back with regard to front sides of the optical fiber section.

3. The optical connector according to claim 1, wherein the ESD protection means further comprises a plurality of discharge fingers, each discharge finger having at least one discharge section disposed thereon.

4. The optical connector according to claim 3, wherein the free ends of the discharge sections extend essentially parallel to the introduction direction of the complementary connector.

5. The optical connector according to claim 4, wherein the receptacle includes a single cavity having, at a front side, an opening for introducing the complementary connector and, at the rear wall, a pair of optical connection elements.

6. The optical connector according to claim 5:
wherein the ESD protection means further includes first and second discharge sections, each of the first and second discharge sections including first and second conductive fingers extending transversely with respect to the introduction direction of the complementary connector;
wherein the ESD protection means further includes a third discharge section arranged between the pair of optical connection elements, and
wherein the conductive fingers are assigned to a pair of electro-optical components.

7. The optical connector according to claim 6, wherein the conductive fingers extend along a front side of the pair of electro-optical components.

8. The optical connector according to claim 6, wherein the conductive fingers are offset transversely with respect to the introduction direction.

9. The optical connector according to claim 8, wherein the first and second conductive fingers are formed asymmetrically.

10. The optical connector according to claim 5:
wherein the ESD protection means has further includes discharge conductive fingers, each discharge conductive finger having a discharge section;
wherein the first optical connection element of the pair is arranged between a first and a third of the discharge sections;
wherein the second optical connection element of the pair is arranged between a second and the third of the discharge sections; and
wherein the third discharge section is arranged between the first and second optical connection elements of the pair.

11. The optical connector according to claim 10, wherein the cavity of the receptacle is bounded by the rear wall at a rear side opposite to the front side, the rear wall having at least three openings through which the respective discharge sections extend.

12. The optical connector according to claim 10, wherein the discharge sections are stamped and formed from sheet metal at the ends of integral fingers.

13. The optical connector according to claim 10, wherein the external electrical shielding is designed in the form of an essentially U-shaped shielding clamp which engages around the dielectric connector housing rearwards.

14. The optical connector according to claim 13, wherein the ESD protection means is arranged essentially centrally in the U-shaped shielding clamp.

15. The optical connector according to claim 14, wherein the U-shaped shielding clamp has integrally-formed press-on lugs for biasing the electro-optical components against the rear wall of the housing in the introduction direction.

16. The optical connector according to claim 1, wherein the ESD protection means further includes a dedicated connection element for connection to an electrical circuit board.

* * * * *